Patented Mar. 23, 1954

2,673,159

UNITED STATES PATENT OFFICE 2,673,159

PRESERVATION OF CITRUS FRUIT

David J. Beaver, Richmond Heights, Mo., assignor to Monsanto Chemical Company, St. Louis, Mo., a corporation of Delaware No Drawing. Application November 25, 1952, Serial No. 322,588

4 Claims. (Cl. 99—154)

This invention relates to methods of treating fruit to prevent or inhibit the growth of destructive fungi. More particularly the invention relates to treatment of citrus fruit for the purpose of preventing the development of the fugus which causes "stem-end rot."

Citrus fruit is subject to attack by the fungi *Phomopsis citri* and *Diplodia natalensis*, which produce the effect known to the citrus fruit industry as "stem-end rot." Other objectionable fungi are also common, for example the blue and green pencillia molds. These organisms cause extensive destruction to citrus fruit during storage and shipping.

The primary purpose of this invention is to provide improved methods of treating fruit to prevent loss by action of fungus. A further purpose of the invention is to provide a fungicidal method which does not injure the fruit chemically. Further purposes of the invention will be apparent from the following disclosure.

It has been found that thionocarbazate esters are effective in inhibiting the growth of stem-end rot and blue mold producing organisms. The treatment is effected by contacting the fruit with a solution or dispersion of the thionocarbazate by dipping, spraying or otherwise coating the surface. In general concentrations of 0.5 to 10% by weight on the thionocarbazate are useful but preferred practice involves use of concentrations of about 1 to 5% by weight.

The thionocarbazates useful in the practice of this invention may be represented by the structural formula

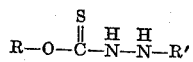

where R represents an alkyl, alkylene, alicyclic or aralkyl group and R' represents hydrogen or an alkyl, alicyclic, aralkyl or aryl group. Examples of suitable alkyl groups are methyl, ethyl, isopropyl, n-propyl, sec. butyl, n-butyl, sec. amyl, n-amyl, n-hexyl, sec. hexyl, decyl, dodecyl, chlorethyl, chloropropyl, allyl and isopropenyl. Suitable aralkyl groups comprise benzyl, orthochlorbenzyl, monochlorbenzyl, dichlorbenzyl, trichlorbenzyl and phenethyl groups. An alicyclic group is illustrated by cyclohexyl.

The compounds may be easily applied in aqueous emulsion or in solution in a suitable organic solvent. The thionocarbazates are soluble in common organic solvents. For example ethyl 2-phenyl thionocarbazate is soluble in acetone, benzene, hot petroleum ether and alcohol. Isopropyl alcohol is a satisfactory solvent. Similarly the compounds may be applied in ethyl alcohol solution or in mixtures of water and alcohol in which the particular compound is soluble. If desired, they may be applied simultaneously with the wax customarily used for coating the fruit. One common method of applying a wax or resin is by spraying. This seals the rind and retains the flavor as well as improves the appearance of the fruit. The thionocarbazates may be incorporated in these compositions and sprayed along with the wax. Application in aqueous emulsion is also feasible. The esters are generally soluble in waxes and may be suspended in aqueous wax emulsions applied to the fruit by the familiar dipping operation. Application has also been carried out successfully in polystyrene emulsion and in polyvinyl acetate emulsion.

Further details of the practice and effect of the invention are set forth with respect to the following examples which however are not to be construed as limiting the invention.

Example

Oranges were treated with various thionocarbazates to ascertain the effect of the esters on the growth of fungus. For example, various lots of oranges were treated with 5%, 2.5% and 1.25% alcohol solutions of ethyl 2-phenyl thionocarbazate and then stored for three weeks at 70° F. The tests were accompanied by a control experiment in which the oranges were dipped in alcohol containing no thionocarbazate. Typical data are set forth in the following table and designate the total number of oranges decayed after the three weeks period as the result of stem-end rot, penicillium rot and miscellaneous decays.

| | No. of Oranges | Percent of Oranges Decayed | | | |
|---|---|---|---|---|---|
| | | Control | 5% | 2.5% | 1.25% |
| Ethyl 2-phenyl thionocarbazate | 25 | 52 | 20 | 8 | 20 |

No injury whatsoever was observed with any of the treatments with ethyl 2-phenyl thionocarbazate.

Examples of other thionocarbazates comprise ethyl thionocarbazate, isopropyl thionocarbazate, butyl thionocarbazate, ethyl 2-benzyl thionocarbazate, butyl 2-benzyl thionocarbazate, methyl 2-benzyl thionocarbazate, methyl thionocarbazate, isopropyl 2-phenyl thionocarbazate, butyl 2-phenyl thionocarbazate, benzyl thionocarbazate and benzyl 2-phenyl thionocarbazate. Although as has been indicated halogen substituents may be present, it has been found nitro substituents are undesirable. The presence of nitrophenyl and dinitrophenyl groups detracted from the preservative properties. The thionocarbazates may be prepared by methods described in the literature. See for example J. Wangel Arkiv. Kemi, I, 431-45 (1950).

It is intended to cover all changes and modifications of the examples of the invention herein chosen for purposes of disclosure which do not constitute a departure from the spirit and scope of the invention.

What is claimed is:

1. The method of retarding fungus growth on citrus fruit which comprises contacting the fruit with a thionocarbazate.

2. The method of retarding fungus growth on citrus fruit which comprises contacting the fruit with a thionocarbazate of the formula

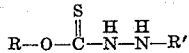

where R is selected from the group consisting of alkyl, alkylene, alicyclic and aralkyl groups and R' is selected from the group consisting of alkyl, alicyclic, aralkyl and aryl groups.

3. The method of retarding fungus growth on citrus fruit which comprises contacting the fruit with a thionocarbazate of the formula

where R is an open chain hydrocarbon group and R' is a phenyl group.

4. The method of retarding fungus growth on citrus fruit which comprises contacting the fruit with ethyl 2-phenyl thionocarbazate.

DAVID J. BEAVER.

References Cited in the file of this patent

J. A. C. S., vol. 74, No. 14, July 20, 1953, pages 3647 to 3649, inclusive, article entitled "The Reaction of Arylamines With Diethyl Thionothiodiformate" by Ralph Sayre.